United States Patent
Hohmann et al.

(10) Patent No.: US 10,981,255 B2
(45) Date of Patent: Apr. 20, 2021

(54) METHOD FOR THE DOCUMENTED TIGHTENING OR TIGHTENING UP OF A SCREW CONNECTION

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 2 days.

(21) Appl. No.: 16/112,820

(22) Filed: Aug. 27, 2018

(65) Prior Publication Data
US 2019/0061075 A1    Feb. 28, 2019

(30) Foreign Application Priority Data

Aug. 28, 2017  (DE) .................... 10 2017 119 676.5

(51) Int. Cl.
*B23P 19/06* (2006.01)
*B25B 29/02* (2006.01)
(Continued)

(52) U.S. Cl.
CPC .......... *B23P 19/067* (2013.01); *B25B 23/147* (2013.01); *B25B 23/1456* (2013.01); *B25B 29/02* (2013.01)

(58) Field of Classification Search
CPC ... B23P 19/067; B25B 23/1456; B25B 29/02; B25B 23/147; B25B 23/1422
See application file for complete search history.

(56) References Cited

U.S. PATENT DOCUMENTS

| 3,749,362 A * | 7/1973 | O'Connor | B23P 19/068 |
| | | | 254/29 A |
| 2010/0175240 A1* | 7/2010 | Wagner | B23P 19/067 |
| | | | 29/407.08 |

(Continued)

FOREIGN PATENT DOCUMENTS

| WO | 2008/092768 | 8/2008 |
| WO | 2010/054959 | 5/2010 |

OTHER PUBLICATIONS

Erik Oberg, Franklin D. Jones, Holbrook L. Horton, and Henry H. Ryffel, "Machinery's Handbook", 2012, 29th Edition, p. 1521 (Year: 2012).*

*Primary Examiner* — Lawrence Averick
(74) *Attorney, Agent, or Firm* — Gudrun E. Huckett

(57) ABSTRACT

In a method for the documented tightening or tightening up of a heavily loaded screw connection of a threaded bolt and a nut screwed on the threaded bolt by using an axially operating tensioning device and a process control unit provided with a documentation module, the screw connection is identified by scanning an identification provided on the screw connection and data determined by scanning the identification is stored in the documentation module. The screw connection is lengthened by the tensioning device by axially pulling on a threaded end of the threaded bolt and a tightening force ($F_A$) and/or a tightening pressure ($P_A$) exerted by axially pulling on the threaded end is stored in the documentation module. After lengthening, the nut is turned by using a hand torque wrench and an actually exerted hand torque applied for turning the nut is stored in the documentation module.

18 Claims, 4 Drawing Sheets

(51) Int. Cl.
*B25B 23/145* (2006.01)
*B25B 23/147* (2006.01)

(56) References Cited

U.S. PATENT DOCUMENTS

| | | | |
|---|---|---|---|
| 2013/0047408 A1* | 2/2013 | Kibblewhite | B25B 21/002 29/525.01 |
| 2015/0041162 A1* | 2/2015 | Chu | B25B 23/1456 173/1 |
| 2016/0271775 A1 | 9/2016 | Hohmann et al. | |

* cited by examiner

METHOD FOR THE DOCUMENTED TIGHTENING OR TIGHTENING UP OF A SCREW CONNECTION

BACKGROUND OF THE INVENTION

The invention relates to a method for the documented tightening or tightening up of a heavily loaded screw connection comprised of a threaded bolt and a nut screwed thereon, by using an axially operating, preferably hydraulically driven tensioning device and a process control unit provided with a documentation module.

With this method the screw connection is identified by scanning an identification provided on the screw connection, preferably a barcode identification. The data thus detected are stored in the documentation module. The screw connection is extended longitudinally by means of the tensioning device through axially pulling on the thread end of the threaded bolt, and the tightening force and/or tightening pressure thereby expended is stored in the documentation module. After the longitudinal extension, the nut is turned by using a hand torque wrench, and the hand torque actually expended is stored in the documentation module.

Hydraulically operated bolt tensioning devices are known from the prior art, by way of example from WO 2008/092768 A2, WO 2010/054959 A1 or US 2016/0271775 A1. With tensioning devices of this kind first an exchangeable bush is screwed onto the (threaded) bolt or brought into engagement therewith in order to tension the bolt. For this the exchangeable bush can be provided with a corresponding internal thread. The exchangeable bush is arranged inside a hydraulic cylinder housing and is surrounded by at least one piston entraining the exchangeable bush. The piston, by way of example as part of a hydraulic piston-cylinder unit, can axially entrain the exchangeable bush. The bolt which is to be tensioned is thereby axially extended. Whilst it is extended a nut supporting the bolt with respect to a machine part, can be tightened up, i.e. can be turned.

Often the operating parameters actually used as well as general data relating to the relevant screw case are not detected and documented. Such data can be by way of example the manufacturer, the type or the model of the bolt or the nut, as well as tightening and torque values of the bolts and/or nuts. Often the bolt tensioning devices lack suitable devices for detecting and documenting such data. There is furthermore often a lack of measures for evaluating, checking and securely storing such data. This can be of relevance with screw connections in which a permanent control check is necessary and for safety reasons proof has to be provided of a sufficiently strong screw connection, by way of example in the case of reactor or storage containers with chemical or nuclear dangerous goods.

There is furthermore a problem when the user of the bolt tensioning device does not initially know in which region the required or ideal hydraulic pressure and the tightening pressure or tightening force connected therewith lies for the bolt which is to be tensioned. The values can vary depending on type, manufacture or size of the bolt. In cases of doubt this can lead to the bolt being loaded with excessively high tensile stresses which can lead ultimately to the threaded bolt breaking or spinning out. Apart from these factors which influence the operating safety, the quality and precision of the tightening or tightening up process can also be reduced if the bolts are not loaded with the ideal tightening force. The same applies when using a less than ideal torque when turning the nut.

Obtaining information by reading identifications, by way of example barcodes, by suitable sensors or scanners is generally known. Thus component parts, labels, advertising boards etc can be provided with identifications which are then detected and read by a suitable scanner. After identification, specific information filed for the respective barcode can be retrieved. Such barcodes scanners are integrated as standard in modern telecommunication appliances. For there the camera in conjunction with a suitable application software (App) undertakes the function of such a barcode scanner. Barcode scanners as separate appliances are known by way of example from the retail trade for scanning purchases at the cash desk. It is decisive that the barcode scanners are provided with a light source and are positioned at a distance from the scan object during the scanning process. The barcode must however be located in the incidence field or exposure range of the object lens or scanner. Positioning the scanner relative to the scan object is often independent of angles. Arrangements deviating from the ideal positioning angle between the scanner and barcode can be compensated where applicable by suitable focusing optics.

The object of the invention is to enable when tightening or tightening up high-tensile screw connections with axially operating tensioning devices a data document which is specific to each screw type and thus to improve the operating reliability, quality and reproducibility of the screw process.

SUMMARY OF THE INVENTION

In accordance with the invention, this is achieved by a method for the documented tightening or tightening up of a heavily loaded screw connection comprised of a threaded bolt and a nut screwed thereon, by using an axially operating preferably hydraulically driven tensioning device, and a process control unit provided with a documentation module, wherein 1) the screw connection is identified by scanning an identification, preferably a barcode identification, provided on the screw connection, and the data thus detected are stored in the documentation module;

2) the screw connection is elongated by means of the tensioning device through axially pulling at the threaded end of the threaded bolt and the tightening force and/or the tightening pressure thereby applied is stored in the documentation module;

3) after elongation the nut is turned by using a hand torque wrench and the hand torque actually exerted thereby is stored in the documentation module.

By using the method different data underlying each screw case are reliably documented and can be stored in reproducible manner. The data can be of a general nature and comprise by way of example the manufacturer's mark, make, serial number, model, type or physical and technical parameters of the screw connection. The data can relate to the threaded bolt or also to the nut.

After scanning the screw connection, the latter is identified and the identification result is stored in the documentation module. In the documentation module the identified screw connection can be additionally assigned a date, time, project number or other data, and these can be stored alongside.

The data are stored in a common file which can be lodged inter alia on an external server, an external computer unit or in a data cloud. The same applies for the tightening force and/or tightening pressure applied, as also for the hand torque actually applied, thus all the data which are stored in the documentation module. All the data can be stored in a single file or in several different files. The documentation of the data enables a quality and condition check to be subsequently carried out at any time on the screw connection, more particularly a follow-up check over a longer period.

In an advantageous configuration of the invention after identification of the screw connection the operator is suggested a tightening force and/or tightening pressure stored in a database from the process control unit before the tightening process is started by the operator. The process control unit can for this purpose access an electronic database. The database can contain for the relevant identified screw connection optimal or recommended values and/or value ranges for the tightening forces and/or tightening pressures. By using the parameters thus proposed it is possible to ensure a safer and/or optimized tightening of the screw connection.

An additional safety stage is produced where the operator has to manually confirm or start the beginning of the tightening process after the automatic proposal of the operating parameters.

Should the operator on the other hand prefer from his own experience a different tightening force and/or tightening pressure, then he does not accept the parameter proposal of the process control unit. He can then manually input another value and initiate the tightening process, which is then likewise documented in the documentation module.

The operator or user can manually input all relevant data via an input unit, e.g. via a touch screen or an external operating device of the process control unit. The touchscreen or operating device can be a display unit at the same time. The screwing process can thus be visually followed and controlled.

According to a further configuration of the invention, after identification of the screw connection, a tightening force and/or tightening pressure stored in the database is selected automatically by the process control unit and a pump of the hydraulic screw tensioning device is automatically moved to this pressure. The pump adjusts the pressure in the hydraulically driven tensioning device and is connected to this via corresponding supply and discharge lines. The pump can be connected by signal processing to the process control unit.

It is advantageous when after identification of the screw connection by means of the process control unit a tightening force and/or a tightening pressure stored in the database is selected automatically by the process control unit, and the tightening process is started automatically by using the selected values.

In order to carry out the method according to the invention a tensioning device, inter alia, is used. This device comprises a cylinder housing designed as a hydraulic cylinder, an exchangeable bush which is arranged in the cylinder housing and which is provided at its end facing the threaded bolt with an internal thread and can be screwed onto the threaded bolt, and at least a piston which is axially movable in the cylinder housing and can be connected to a hydraulic supply and through which the exchangeable bush is centrally guided and by means of which the exchangeable bush can be axially entrained. The cylinder housing or a component connected therewith can be supported on a base, by way of example a machine element as an abutment. The method according to the invention is particularly advantageous when using a hydraulic tensioning device of this kind. For enormous forces occur when extending the threaded bolt by pulling on its threaded end section. Documentation of the tightening forces and/or hydraulic tightening pressures applied can be of particular advantage for the operating reliability within the scope of a safety documentation or parameter monitoring.

With high tightening forces and/or tightening pressures there is in particular the danger of the threaded bolt springing or shooting out. It may also happen that the exchangeable bush in such a case comes away from the thread of the bolt and likewise shoots out. In order to avoid such cases an automatic selection of the tightening forces and/or tightening pressures which are suitable and/or optimum for the identified screw connection can be advantageous, whether with or without a subsequent release requirement from the user.

It is further advantageous to screw the exchangeable bush onto the threaded bolt with the hand torque wrench already used in the method according to the invention. When screwing the exchangeable bush onto the bolt and turning the nut two important steps of the method according to the invention are carried out at the same time by means of one and the same tool. The hand torque wrench can be an electronic hand torque wrench.

It is advantageous to scan the identification with a sensor, more particularly a barcode scanner. This can be an optical sensor. The sensor can be a component of the tensioning device, the hand torque wrench or a separate apparatus. Optical sensors are as a rule relatively cost-effective, can be easily applied and easily operated. This facilitates implementing a sensor of this type in the tensioning device or on the hand toque wrench. The sensor barcode scanner can be arranged by way of example outside on the tensioning device or inside the tensioning device. Attachment can be outside on the cylinder housing or inside on the exchangeable bush.

When the sensor is located on the hand torque wrench then the sensor can be arranged there at any position. It is important however that the sensor is not damaged by mechanically operating elements of the hand torque wrench, e.g. the multi edge. An arrangement of the sensor on the hand torque wrench can have advantages as regards flexibility and handling of the scanner. For the hand torque wrench is lighter and narrower than the tensioning device.

The sensor can be arranged stationary or be releasably attached. A releasable arrangement has the advantage of being able to regularly inspect the sensor and replace it when damaged. It should equally be observed that when scanning the barcode the sensor is positioned or held in the vicinity of the barcode, namely so that the barcode is located inside the radiation range, illumination range or detection range of the optical sensor. The scan is normally carried out contactlessly, i.e. the sensor can be located at a distance from the barcode.

The sensor can furthermore be a direct component part of a computer unit comprising the process control unit. In this case it can be advantageous when the sensor is a camera.

The computer unit is preferably a mobile computer, more particularly tablet computers, smartphones or other computer modules are particularly suitable for this. It is important that the computer unit has both a display unit and also an input unit. The display unit and input unit can be embodied jointly in a touchscreen. The input unit can moreover be formed as a keyboard or buttons. The use of a stationary computer as a computer unit is also possible. In each case the sensor is connected by signal processing to the process control unit.

The tensioning device and/or hand torque wrench and/or the separate device can be provided according to the invention with a transmitting and receiving unit connected by signal processing to the process control unit, by means of which data exchange with the process control unit is possible. The relevant data underlying the scanning, tightening and turning process can then be forwarded to the process control unit and corresponding data arising from this can be sent to the relevant transmitting and receiving unit of the tensioning device or the hand torque wrench.

The process control unit also comprises a transmitting and receiving unit. The transmitting and receiving unit can be by way of example an electric circuit board with transmitting and receiving module. The transmitting and receiving units can be connected in signal connection wirelessly or by wire with one another. WLAN, radio or UMTS connections are suitable by way of example. Practically any type of modern wireless signal transmission can be suitable here. Electronic connecting paths via conductor plates or circuit boards can also be suitable so long as the connecting paths couple the different component parts to one another.

It is advantageous when the process control unit as well as the sensor are controlled with a common applications program. This can be installed by way of example on the computer unit. The computer unit and the external hydraulic supply together with the pump can be arranged by way of example on a trolley.

According to a further configuration of the invention the tightening force or tightening pressure applied can be measured by a pressure sensor and/or a force sensor. Several pressure and/or force sensors can also be used for this. The pressure and/or force sensors can be a direct component part of the hydraulic supply.

In addition, sensors can also be used for measuring the screw length with the method according to the invention. A corresponding sensor is also provided for measuring the torque actually applied on the hand torque wrench.

With a further configuration of the method it is proposed that turning the nut is carried out by means of a gearing arranged on the tensioning device wherein this gearing is provided with a rotary angle sensor. This sensor detects a rotary angle which is covered during turning. This rotary angle can be the rotary angle of the nut itself or another characterising rotary angle which is carried out for example by one of the elements of the turning gearing. The angular value thus detected is likewise stored for which the rotary angle sensor is connected by signal processing to the process control unit so that the detected rotary angle value is available in the process control unit for processing and evaluation.

With this evaluation a statement on the remaining extension and thus the lengthening of the threaded bolt is gathered from the rotary angle value covered in association with the known thread pitch of the threaded bolt. This elongation value is documented in the documentation module.

When the predetermined rotary angle, corresponding to the lengthening of the threaded bolt, has been covered and the nut is then turned with the predetermined torque up to a stop, then it is ensured that the threaded bolt has been tightened with the corresponding force.

It is imperative that the documentation module comprises a memory and/or a database. The data on the identification and the tightening and turning process, more particularly the tightening force and/or the tightening pressure used, as well as the hand torque actually applied, can be stored in such a memory and/or such a database.

According to a further preferred configuration of the invention an optical signal is displayed to the user as soon as the tightening and turning process is concluded.

BRIEF DESCRIPTION OF THE DRAWINGS

Further details and advantages of the method according to the invention are apparent from the following description of an exemplary embodiment illustrated in the figures.

DESCRIPTION OF PREFERRED EMBODIMENTS

The method according to the invention for the documented axial tightening or tightening up of a heavily loaded screw connection 1 is shown in FIGS. 1 to 4.

Figure 1:
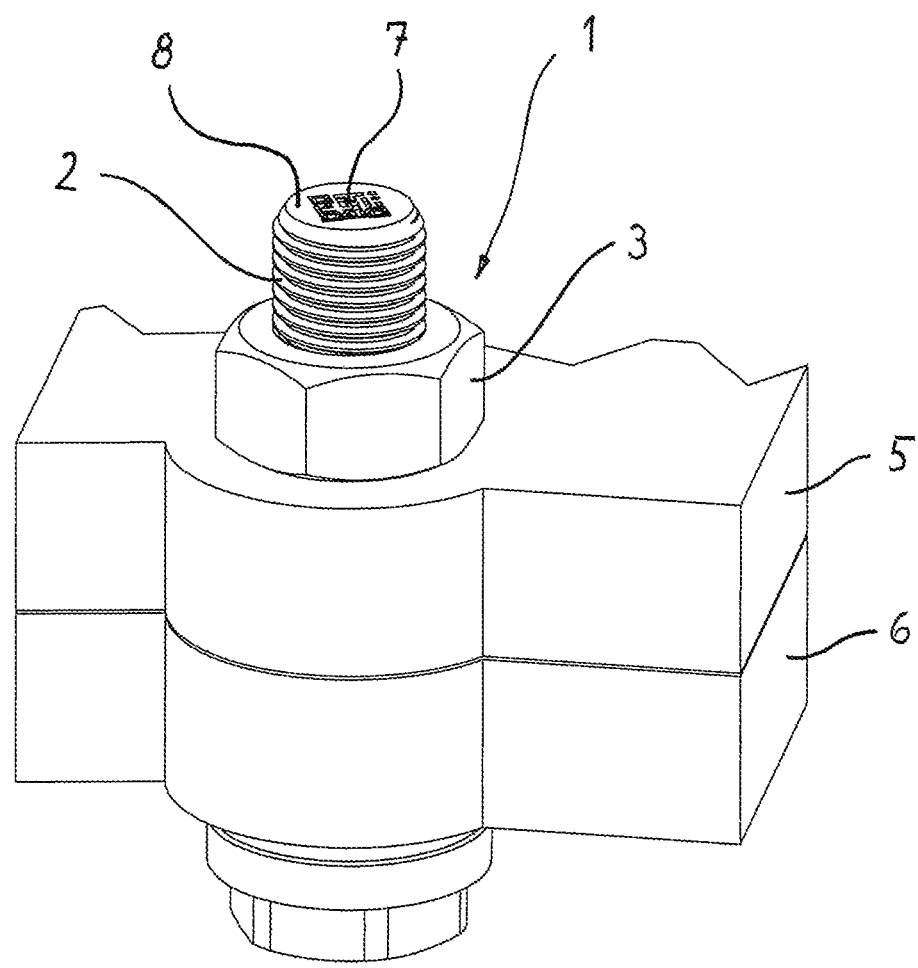
FIG. 1 shows a threaded bolt with nut clamping two machine parts.

As shown in FIG. 1, such screw connections 1 are comprised of a long threaded bolt 2 and a nut 3 screwed thereon. The screw connection 1 here tensions two machine parts 5, 6 to one another. Apart from the threaded bolt 2 and the nut 3 further elements can also be a component part of the screw connection 1, by way of example a further nut on the side remote from the nut 3 of the further machine part 6 which is to be tensioned. Washers are also often component parts of such screw connections 1. An identification 7 has to be arranged on the screw connection 1, thus on the threaded bolt 2 or the nut 3, for the method according to the invention. This is shown in FIG. 1 by way of example using a barcode 7 arranged on the end side 8 of the threaded bolt 2 or threaded bolt end. The identification 7 can however also be arranged at other places on the threaded bolt and/or nut.

The barcode 7 is first scanned with a suitable sensor. The sensor or scanner can be arranged by way of example on a hand torque wrench 10 (FIG. 2) which as described below is used in any case within the scope of the method according to the invention. The sensor or scanner can also be part of a mobile computer unit, e.g. a tablet computer, a smartphone or a mobile computer unit. The sensor can be by way of example a camera. A separate scan module, which is used solely for scanning the identification 7, can also be used within the scope of the method according to the invention. The barcode can then be detected with the sensor and the screw connection 1 can be identified before the actual tightening or tightening up.

An arrangement of the sensor or scanner in or on the tensioning device 11 itself can also be provided. The tensioning device 11 is then set on the bolt 2 which is to be tensioned and the barcode scanned immediately before tensioning.

The information obtained by scanning is the basis for identifying the screw connection 1, e.g. the exact type of screw connection. The screw connection 1 is then in the next step lengthened by a solely axial pull on the threaded end 15 of the threaded bolt 2.

For this extension process the operator or user can be offered processing parameters for tightening or turning by means of a process control unit for the relevant identified type of screw connection 1, by way of example by retrieving data pages with corresponding values stored in a database.

The user can then confirm or decline the use of the parameters proposed to him. The method according to the invention can also be carried out without a parameter proposal of this kind.

An automated method with automatic pressure adjustment of the pump of the hydraulic supply, and subsequent automatic start of the tightening process is possible.

Figure 2:
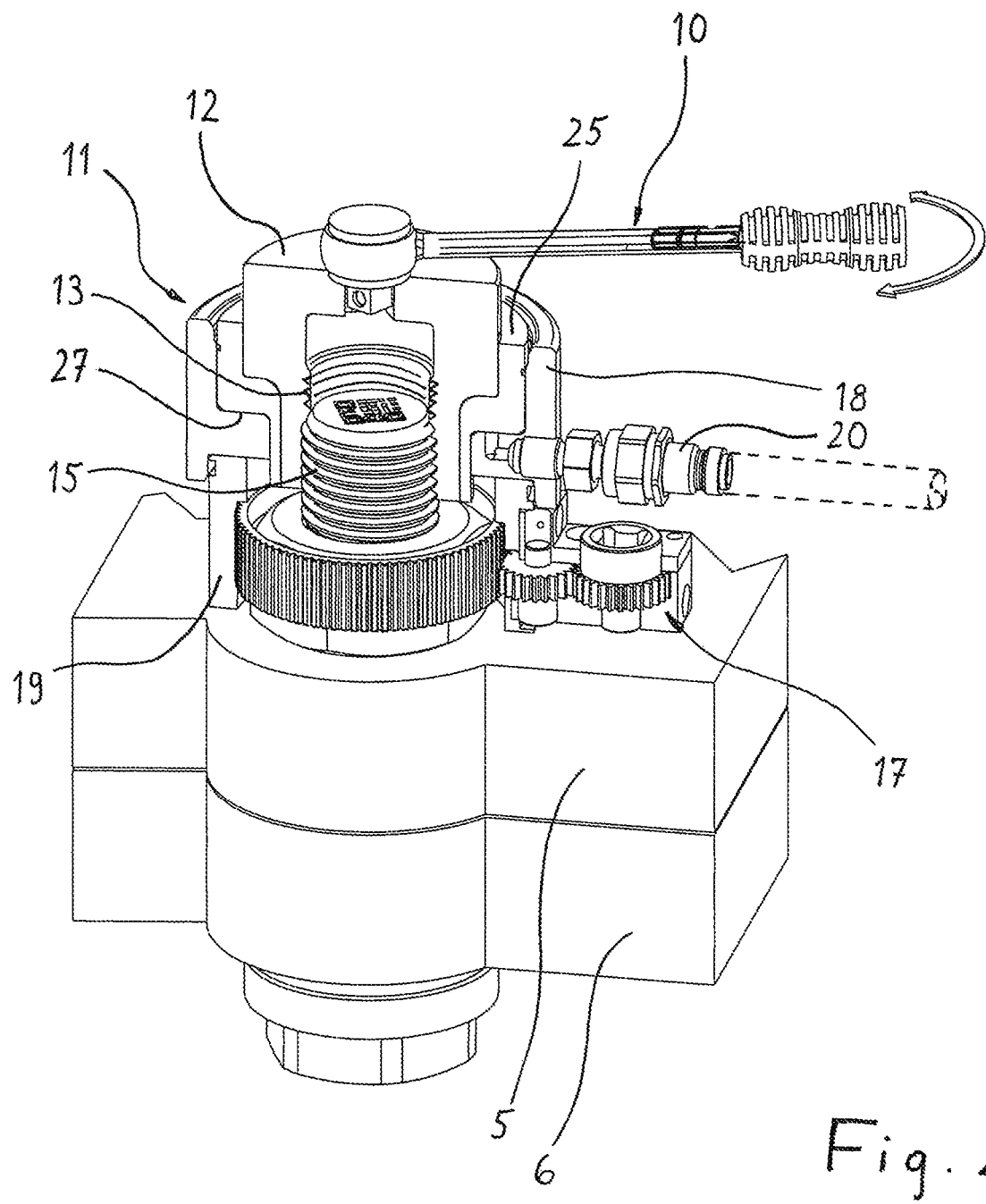
FIG. 2 shows in a perspective view a hydraulically operating threaded bolt tensioning device, set in alignment with the threaded bolt and supported on the upper machine part. Also shown is a hand torque wrench for screwing an exchangeable bush onto the threaded bolt.
Figure 3:
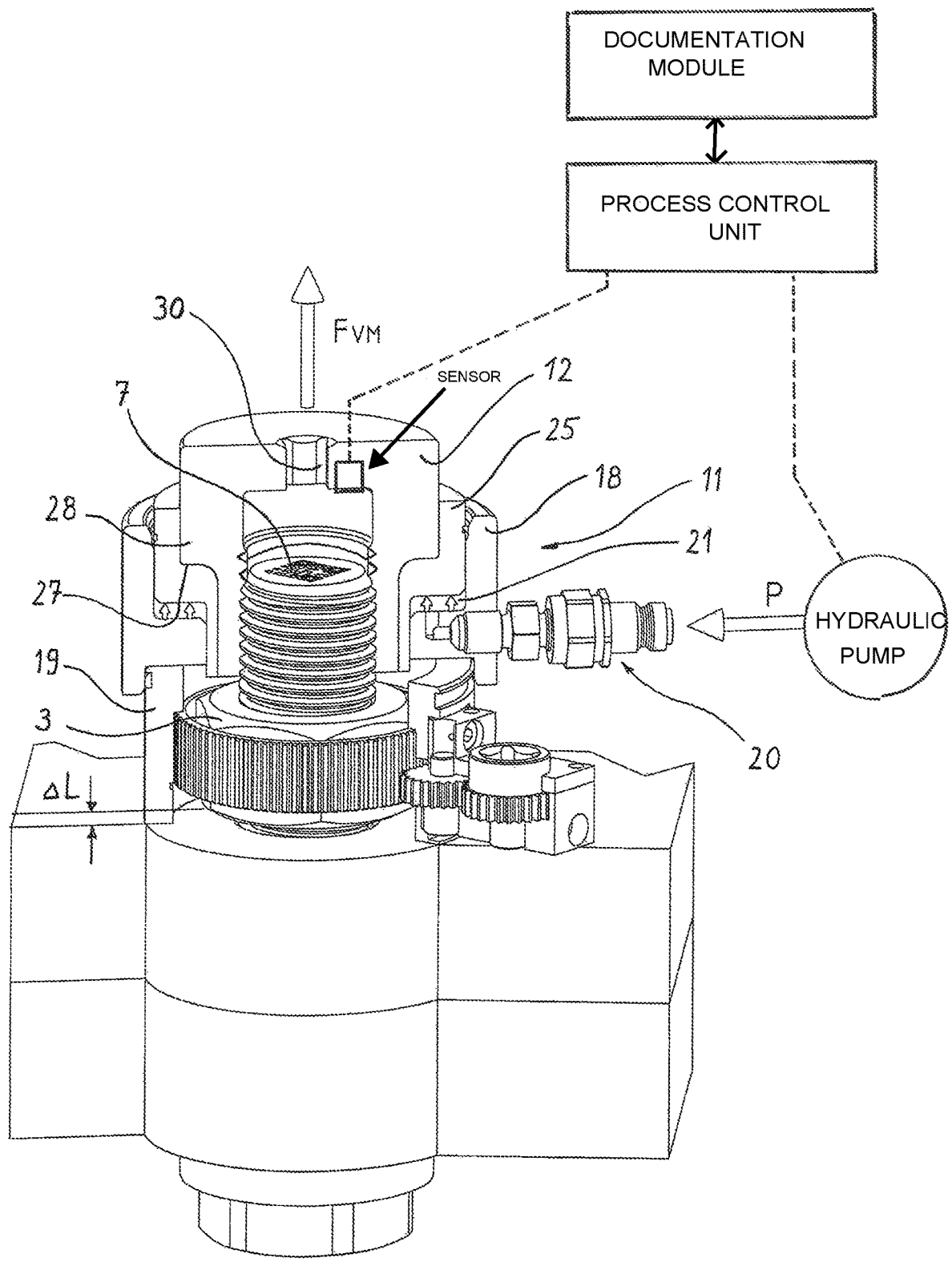
FIG. 3 shows the same threaded bolt tensioning device as in FIG. 2 during the tensioning process.
Figure 4:
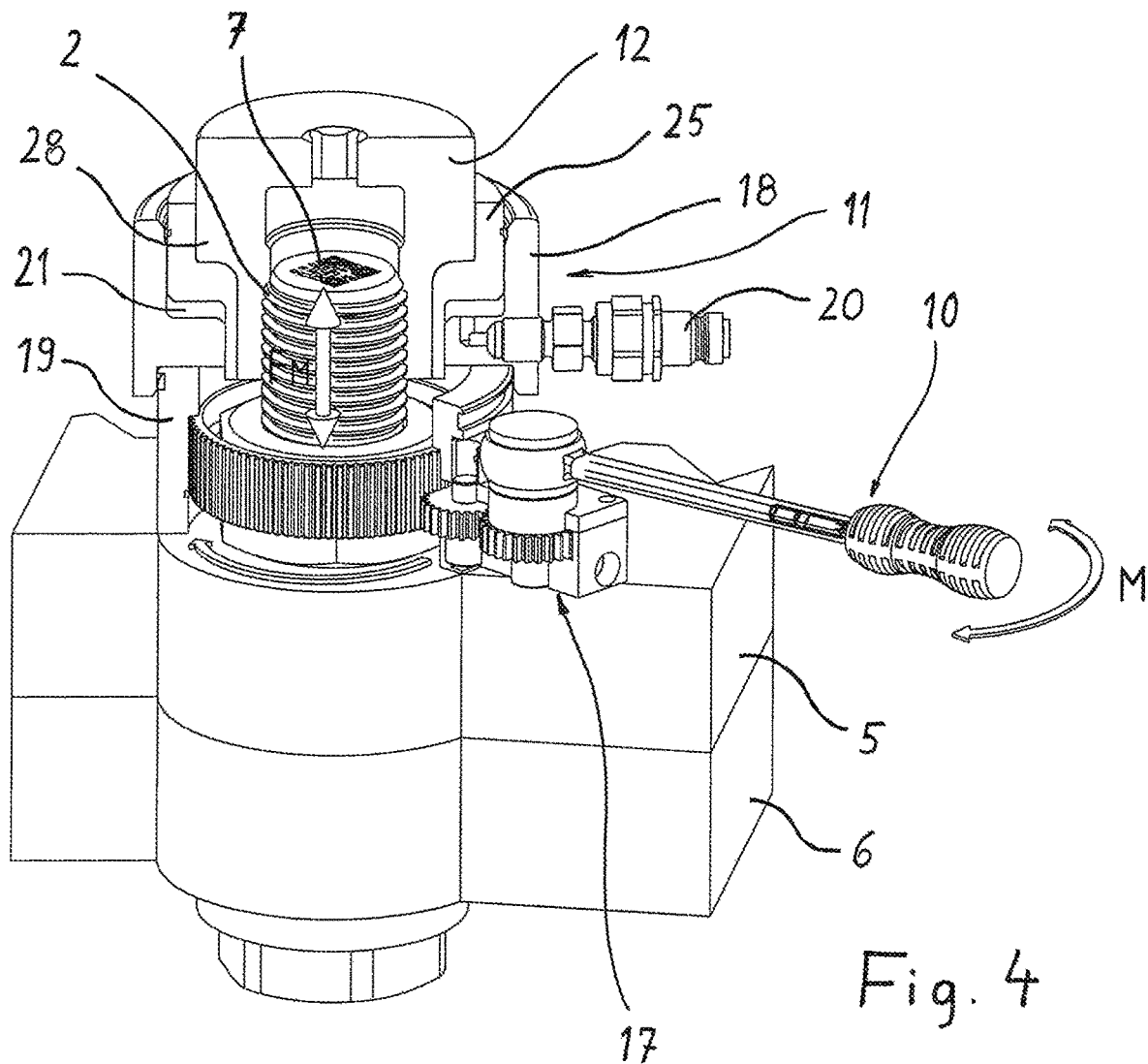
FIG. 4 shows the same threaded bolt tensioning device as in FIG. 2 and FIG. 3, when tightening up the nut with the hand torque wrench.

The heavily loaded screw connection 1 illustrated in FIG. 1 is tightened or tightened up by a purely axially operating hydraulically operated tensioning device 11. The tensioning device 11 and the procedure of tightening and tightening up are shown in FIGS. 2 to 4. The screw connection 1 is longitudinally extended by axially pulling on the threaded end of the threaded bolt 2 protruding over the nut. The tightening force $F_A$ thereby expended and/or the tightening pressure $P_A$ exerted by means of the hydraulics is automatically stored in the documentation module, namely independently of whether it is a tightening force set by the user from his experience, or a tightening force $F_s$ proposed by the system and derived from the values in a database and/or a stored tightening pressure $P_s$.

Whilst with the tensioning device 11 a predetermined pretensioning force $F_{VM}$ is exerted for a certain time on the threaded bolt 2 in the longitudinal direction of the bolt, the nut 3 of the screw connection 1 which is screwed onto the threaded bolt 2 can be tightened or retightened. This happens by means of a hand torque wrench 10. The hand torque $M_H$ actually exerted until released is likewise stored in the documentation module.

The tensioning device 11 illustrated in perspective views in FIGS. 2 to 4 will be described in further detail below with reference to the method according to the invention. It should be noted that the tensioning device 11 is shown in the figures partially open in sectional view.

An exchangeable bush 12 arranged centrally in the tensioning device 11 is provided at its lower end with an internal thread 13. The exchangeable bush 12 is screwed with this internal thread 13 onto the threaded end section 15 of the threaded bolt 2, which protrudes beyond the nut 3, prior to starting the tensioning process. This screwing takes place preferably with a hand torque wrench 10. For the actual tensioning process the exchangeable bush 12 screwed onto the threaded bolt 2 is set hydraulically under axial tension whereby the threaded bolt 2 is extended in the longitudinal direction by the length $\Delta L$. The force $F_{VM}$ now acts on the threaded bolt 2.

As result of the temporary lengthening of the bolt 2 the underneath side of the nut 3 becomes free so that the nut 3 can be turned first with little torsional resistance and then with increasing torsional resistance and can be tightened up in this way. A turning device 17 arranged around the nut is helpful here. This can be a constituent part of the tensioning device 11. The hand torque wrench 10 is set on the turning device 17.

The hydraulic tensioning mechanism is enclosed by a pressure-resistant cylinder housing 18. The rigid projection of the cylinder housing 18 downwards forms a support tube 19 surrounding the nut 3. The support tube 19 can be integral with the cylinder housing 18 or alternatively a separate part from the cylinder housing 18 but can be placed thereon. The support tube 19 is open at its lower side and is supported on a fixed base, e.g. a machine part 5, which during the tensioning process serves as the abutment. With the method described here the abutment is that machine part 5 on which the nut 3 is supported with its underneath side.

A gearing 17 operating through an opening in the support tube 19 can be provided to turn the nut 3. This gearing forms the turning device 17.

The torque required for turning is applied by moving the hand torque wrench 10 set on the gearing 17 to and fro until the set torque is reached and the torque wrench 10 is released. The nut 3 can naturally only be turned whilst the tensioning device 11 is still working.

A hydraulic connection 20 is located at the side on the cylinder housing 18 via which the hydraulic operating chamber 21 of the tensioning device 11 is connected valve-controlled to an external hydraulic supply. The external hydraulic supply together with the pump can be arranged for example on a trolley. In the hydraulic cylinder there is a piston 25 mounted movable in the longitudinal direction, sealed from the inside wall of the cylinder. The piston 25 is raised by feeding hydraulic pressure into the hydraulic operating chamber 21 of the cylinder. This can take place by way of example against the force of a strong spring which biases the piston 25 from above and which serves as a piston resetting spring and biases the piston 25 directly with a force which aims at keeping the piston 25 in its basic position in which the hydraulic working chamber 21 has its minimum level. This is not shown in the drawings and is optionally part of the tensioning device 10.

The piston 25 encloses the exchangeable bush 12 in a ring. It is provided on its inner edge with a peripheral step 27 which facing away from the base forms an entrainment surface on which the exchangeable bush 12 is supported by a radially widened section 28 attached thereto. The exchangeable bush 12 is in this way axially entrained by the piston 25.

The exchangeable bush 12 is provided on its bolt-side end with the internal thread 13 for screwing onto the threaded bolt 2. At its upper end the exchangeable bush 12 is provided with a socket 30 on which an angled corner of the hand torque wrench 10 can be set in order to turn the exchangeable bush 12 relative to the cylinder housing 18, and thus screw the exchangeable bush 12 onto the threaded bolt 2.

The piston 25 rises under the hydraulic pressure in the working chamber 21 whereby it axially entrains the exchangeable bush 12 supported on the entrainment surface 27. This leads to the extension of the threaded bolt 2 and the formation of a gap $\Delta L$ between the underneath side of the nut 3 and the upper machine element 5. The hydraulic pressure can be set inside the apparatus as a result of scanning and thus identifying the type of screw connection 1 and the force values thus provided, or however after calculation by the operator.

Extending the threaded bolt can be detected through suitable sensors, processed and where applicable likewise stored as a process value. The nut 3 is then turned with extended threaded bolt with the hand torque wrench 10 until reaching the torque release value M, for which the turning device 17 serves.

Turning the nut 3 is carried out by means of the gearing 17 arranged on the tensioning device 11. At least one of the turning gearing elements of the gear is provided with a rotary angle sensor. This detects a rotary angle which is covered during the turning.

The detected rotary angle can be the rotary angle of the nut 3 itself, or another characteristic rotary angle which one of the elements of the gearing carries out. The angle value thus detected is likewise stored for which the rotary angle sensor is connected by signal processing to the process control unit so that the detected rotary angle value is available in the process control unit for processing and evaluation.

With this evaluation a statement on the remaining extension and with this the lengthening of the threaded bolt 2 is made from the rotary angle value covered in conjunction with the known thread pitch of the threaded bolt 2 and the nut 3. This extension value is documented in the documentation module.

When the predetermined rotary angle, corresponding to the lengthening of the threaded bolt 2, has been covered and the nut 3 is then turned with the predetermined torque up to the stop, then it is ensured that the threaded bolt 2 has been tightened with the corresponding force.

The tightening moment M actually acting on the nut 3 and applied by the hand torque wrench 10 is detected by a suitable sensor, e.g. through a torque sensor. This value is also transferred to the process control unit and stored in the documentation module.

The transfer of the data and measured values detected during turning of the nut 3 can take place for example via a transmitting and receiving unit arranged on the hand torque wrench 10 or by a transmitting and receiving unit arranged on the turning device 17. These are then in signal connection with the process control unit. The torque $M_H$ actually applied is stored in the documentation module together with the axial tightening force $F_A$ or the hydraulic tightening pressure $P_A$ applied.

Any number of different process variables can be stored and/or processed in the documentation module with a correspondingly large memory. By way of example the parameters can be stored in data tables or parameter files, e.g. in table format. These data can then be exported or printed as required, e.g. for proof of evidence.

The specification incorporates by reference the entire disclosure of German priority document 10 2017 119 676.5 having a filing date of 28 Aug. 2017.

While specific embodiments of the invention have been shown and described in detail to illustrate the inventive principles, it will be understood that the invention may be embodied otherwise without departing from such principles.

LIST OF REFERENCE NUMERALS

1 Screw connection
2 Threaded bolt
3 Nut
5 Machine part
6 Machine part
7 Identification, barcode
8 End side
10 Hand torque wrench
11 Tensioning device
12 Exchangeable bush
13 Internal thread
15 Threaded end section
17 Turning device, gearing
18 Cylinder housing
19 Support tube
20 Hydraulic connection
21 Operating chamber
25 Piston
27 Step
28 Radially widened section
30 Socket
M Hand torque
ΔL Length, gap
P Pressure
$F_{VM}$ Force

What is claimed is:

1. A method for the documented tightening or tightening up of a heavily loaded screw connection, comprised of a threaded bolt and a nut screwed on the threaded bolt, by using an axially operating, hydraulically driven tensioning device comprising a pump configured to adjust a hydraulic pressure of the hydraulically driven tensioning device, and a process control unit provided with a documentation module, the method comprising:

identifying the screw connection by scanning with a sensor an identification provided on the screw connection and storing data, determined by scanning with the sensor the identification, in the documentation module;

axially pulling on a threaded end of the threaded bolt projecting past the nut by applying hydraulically an axial tightening force ($F_A$) with the hydraulically driven tensioning device to lengthen the threaded bolt and storing the axial tightening force ($F_A$) and/or a tightening pressure ($P_A$), applied by the hydraulically driven tensioning device to generate the axial tightening force ($F_A$), in the documentation module;

tightening the nut on the threaded bolt by using a hand torque wrench not until the threaded bolt has been lengthened by the step of axially pulling and storing an actually exerted hand torque applied for tightening the nut in the documentation module; and controlling the process control unit and the sensor with a common application program.

2. The method according to claim 1, further comprising, after identifying the screw connection, proposing to a user via the process control unit a stored tightening force ($F_s$) and/or a stored tightening pressure ($P_s$), stored in a database, before tightening of the screw connection is started by the user.

3. The method according to claim 1, further comprising, after identifying the screw connection, the process control unit automatically selecting a stored tightening force ($F_s$) and/or a stored tightening pressure ($P_s$), stored in the database, and further comprising automatically moving a pump to a pressure corresponding to the stored tightening force ($F_s$) and/or the stored tightening pressure ($P_s$) automatically selected by the process control unit.

4. The method according to claim 1, further comprising, after identifying the screw connection, the process control unit automatically selecting a stored tightening force ($F_s$) and/or a stored tightening pressure ($P_s$), stored in the database, and automatically starting tightening of the screw connection by using the stored tightening force ($F_s$) and/or the stored tightening pressure automatically selected by the process control unit.

5. The method according to claim 1, further comprising using a tensioning device, wherein the tensioning device comprises a cylinder housing; an exchangeable bush mounted in the cylinder housing and provided at an end facing the threaded bolt with an internal thread, wherein the internal thread is configured to be screwed onto the threaded bolt; at least one piston axially movable in the cylinder housing and configured to be charged with a hydraulic pressure; wherein the exchangeable bush is centrally guided through the at least one piston, and wherein the exchangeable bush is configured to be axially entrained by the at least one piston.

6. The method according to claim 1, wherein the sensor is a constituent part of the tensioning device; of the hand torque wrench; or of a separate apparatus.

7. The method according to claim 1, wherein the sensor is a constituent part of a computer unit comprising the process control unit, wherein the sensor is a camera.

8. The method according to claim 7, wherein the computer unit is a mobile computer; a tablet computer; or a smartphone.

9. The method according to claim 1, further comprising connecting the sensor for signal processing to the process control unit.

10. The method according to claim 1, wherein the hand torque wrench and/or the tensioning device is provided with a transmitting and receiving unit connected for signal processing to the process control unit and providing a data exchange with the process control unit.

11. The method according to claim 1, wherein a signal connection between the hand torque wrench or the tensioning device and the process control unit is wireless.

12. The method according to claim 1, wherein a signal connection between the hand torque wrench or the tensioning device and the process control unit is provided by a wired link.

13. The method according to claim 1, wherein turning the nut is done by a gearing arranged on the tensioning device and provided with a rotary angle sensor, further comprising storing a rotary angle detected during turning by the rotary angle sensor in the documentation module.

14. The method according to claim 13, further comprising connecting the rotary angle sensor for signal processing to the process control unit.

15. The method according to claim 1, wherein the documentation module comprises a memory and/or a database.

16. The method according to claim 1, further comprising displaying an optical signal to the user as soon as the tightening and turning process is concluded.

17. The method according to claim 1, wherein the axially operating tensioning device is hydraulically driven.

18. The method according to claim 1, wherein the identification is a barcode identification configured to be scanned by a barcode scanner.

* * * * *